United States Patent
Iso et al.

(10) Patent No.: US 6,727,207 B2
(45) Date of Patent: Apr. 27, 2004

(54) ROLLING BEARING

(75) Inventors: Kenichi Iso, Kanagawa (JP); Atsushi Yokouchi, Kanagawa (JP); Michiharu Naka, Kanagawa (JP)

(73) Assignee: NSK Ltd., Tokyo (JP)

(*) Notice: Subject to any disclaimer, the term of this patent is extended or adjusted under 35 U.S.C. 154(b) by 0 days.

(21) Appl. No.: 10/033,918

(22) Filed: Jan. 3, 2002

(65) Prior Publication Data

US 2002/0082175 A1 Jun. 27, 2002

Related U.S. Application Data

(63) Continuation of application No. 09/789,710, filed on Feb. 22, 2001, now abandoned.

(30) Foreign Application Priority Data

Feb. 22, 2000 (JP) ...................... P.2000-044704

(51) Int. Cl.[7] ...................... C10M 169/06; F16C 19/00
(52) U.S. Cl. ...................... 508/287; 508/464; 508/501; 508/506; 508/538; 508/552; 508/579; 384/492
(58) Field of Search ................ 508/287, 506, 508/538

(56) References Cited

U.S. PATENT DOCUMENTS

| 4,156,655 A | 5/1979 | Clarke et al. |
| 4,410,435 A | 10/1983 | Naka et al. |
| 4,424,136 A | 1/1984 | Barreiro et al. |
| 4,443,348 A | 4/1984 | Wright et al. |
| 5,282,689 A | 2/1994 | Imamura et al. |
| 5,301,923 A | 4/1994 | Asao et al. |
| 5,650,380 A | 7/1997 | Fletcher |
| 5,804,536 A | 9/1998 | Asao et al. |
| 5,840,666 A | 11/1998 | Yokouchi et al. |
| 5,915,844 A | 6/1999 | Nanbu |
| 6,020,290 A | 2/2000 | Takata et al. |
| 6,090,755 A | 7/2000 | Wan et al. |

FOREIGN PATENT DOCUMENTS

| DE | 29 02 982 C2 | 8/1979 |
| DE | 43 01 438 C2 | 7/1993 |
| DE | 693 26 052 T2 | 6/1994 |
| WO | WO 9 32 45 99 | 12/1993 |

OTHER PUBLICATIONS

Office Action dated Mar. 11, 2002 in corresponding German patent application.

*Primary Examiner*—Ellen M. McAvoy
(74) *Attorney, Agent, or Firm*—Sughrue Mion, PLLC

(57) ABSTRACT

The present invention is to provide a rolling bearing suitable for the use under a high temperature, high speed, high load and high vibration condition, having a good rust-preventive performance and the excellent flaking life without a hazard to a human body. A rolling bearing is described, comprising an inner race, an outer race and rolling elements, with a grease composition comprising, as the main components, a base oil, a thickener and at least one kind of a rust-preventive additive made from a naphthenate or a succinic acid derivative, packed in a bearing space formed by at least the inner race, the outer race and the rolling elements, said at least one kind of a rust-preventive additive is present in an amount of 0.1 to 10% by weight based on the total amount of the grease composition.

10 Claims, 2 Drawing Sheets

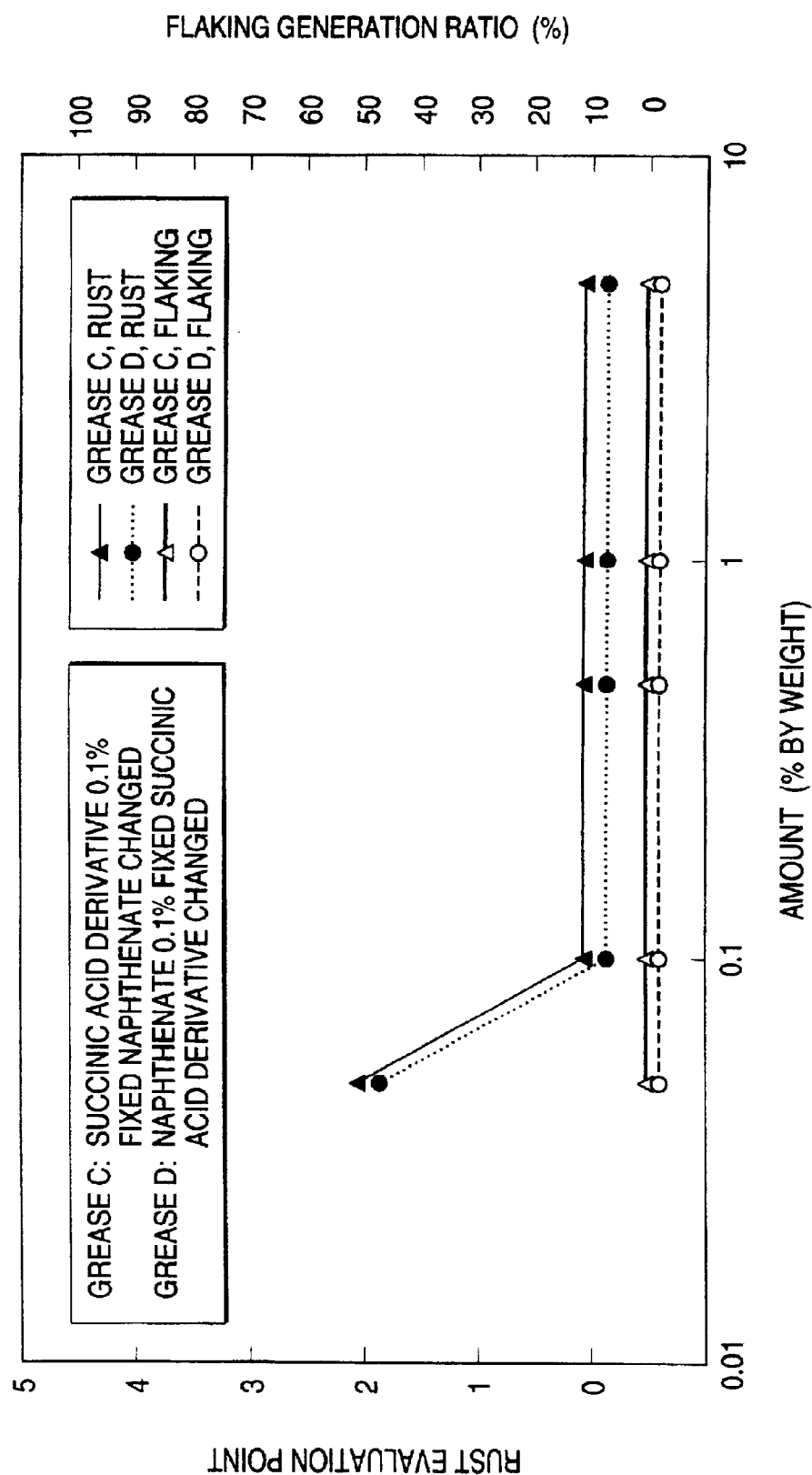

ROLLING BEARING

This is a continuation of application Ser. No. 09/789,710 filed Feb. 22, 2001 now abandoned; the disclosure of which is incorporated herein by reference.

FIELD OF THE INVENTION

The present invention relates to a rolling bearing with a grease composition packed, more specifically, it relates to a rolling bearing having a good rust-preventive performance and the excellent flaking life, suitable for use in a high temperature, high speed, high load and high vibration condition, such as, an alternator and an intermediate pulley, and an electromagnetic clutch for an automobile air-conditioner as electric parts for an automobile or engine accessories.

BACKGROUND OF THE INVENTION

In a rotation part of various power units of an automobile engine, such as electric parts for an automobile or engine accessories including an alternator, an electromagnetic clutch for an automobile air-conditioner, and an intermediate pulley, in general, a rolling bearing is used, and a grease is used as the lubricant therefor.

According to spread of FF cars aiming at a small size and a light weight as well as the demand to enlargement of the car room space, reduction of the engine room volume is inevitable, and thus a smaller size and a light weight of the above-mentioned electric parts and engine accessories are further promoted. Besides, a higher performance and a higher output are required to the above-mentioned parts. However, output decline is unavoidable by achieving a smaller size. For example, in an alternator and an electromagnetic clutch for an automobile air-conditioner, the output decline is compensated by a higher speed so that an idler pulley is made to have a higher speed accordingly. Furthermore, according to the demand for improvement of quietness, sealing of an engine room is enhanced. As a result, since the temperature inside the engine room is raised, the above-mentioned parts should be durable to a high temperature. According to the tendency toward the higher speed and higher performance, flaking accompanying the white structure change by the hydrogen brittleness can easily be generated in a bearing for the above-mentioned parts, and thus prevention thereof is a new important task.

Moreover, since the above-mentioned parts are often mounted in the lower part of an engine room, rain water, or the like, is often scattered thereon during a run. Therefore, a grease to be packed in a rolling bearing for these parts should have a rust-preventive performance superior to a grease to be packed in a rolling bearing to be used in other parts.

In order to provide a rust-preventive performance to a grease, in general, a rust-preventive additive is added. As a component of the rust-preventive additive, an inorganic passivating agent is often contained. In particular, a sodium nitrite is most effective, and thus it is the mainstream. Moreover, since the inorganic passivating agent is water-soluble but is hardly dispersed in an oil-based material such as a grease, a grease containing a surfactant is also commercially available. Furthermore, for example, JP-A-3-200898 proposes a grease provided by adding an oil-soluble organic inhibitor, a water-soluble inorganic passivating agent (sodium nitrite, or the like), and a rust-preventive agent made from a nonionic surfactant to a grease. (The term "JP-A" as used herein means an "unexamined published Japanese patent application") However, although the sodium nitrite as the representative inorganic passivating agent has the excellent rust-preventive performance, it may be carcinogenic, depending on the application condition. Therefore, although it is not limited legally, it is preferable to avoid the use thereof. Moreover, a metal sulfonate as an organic inhibitor is used widely for its high rust-preventive ability, however, since it facilitates generation of a hydrogen as disclosed in Japanese Patent No. 2,878,749, it may cause generation of flaking by the hydrogen brittleness.

SUMMARY OF THE INVENTION

In view of the above-mentioned circumstances, the present invention has been achieved, and an object thereof is to provide a rolling bearing suitable for the use particularly under a high temperature, high speed, high load and high vibration condition, having a good rust-preventive performance and the excellent flaking life without a hazard to a human body.

As a result of the elaborate discussion for solving the problems, the present inventor has found out that a naphthenate and a succinic acid derivative are effective as a rust-preventive additive, and achieved the invention.

That is, the object can be achieved by a rolling bearing according to the invention, comprising an inner race, an outer race and rolling elements, with a grease composition comprising, as the main components, a base oil, a thickener and at least one kind of a rust-preventive additive made from a naphthenate or a succinic acid derivative, packed in a bearing space formed by at least the inner race, the outer race and the rolling elements, said at least one kind of a rust-preventive additive is present in an amount of 0.1 to 10% by weight based on the total amount of the grease composition.

BRIEF DESCRIPTION OF THE DRAWINGS

FIG. 2 is a graph showing the relationship between the rust-preventive addition amount, and the rust evaluation point or the flaking generation ratio of the grease C, and the grease D in the examples.

DETAILED DESCRIPTION OF THE INVENTION

Figure 1:
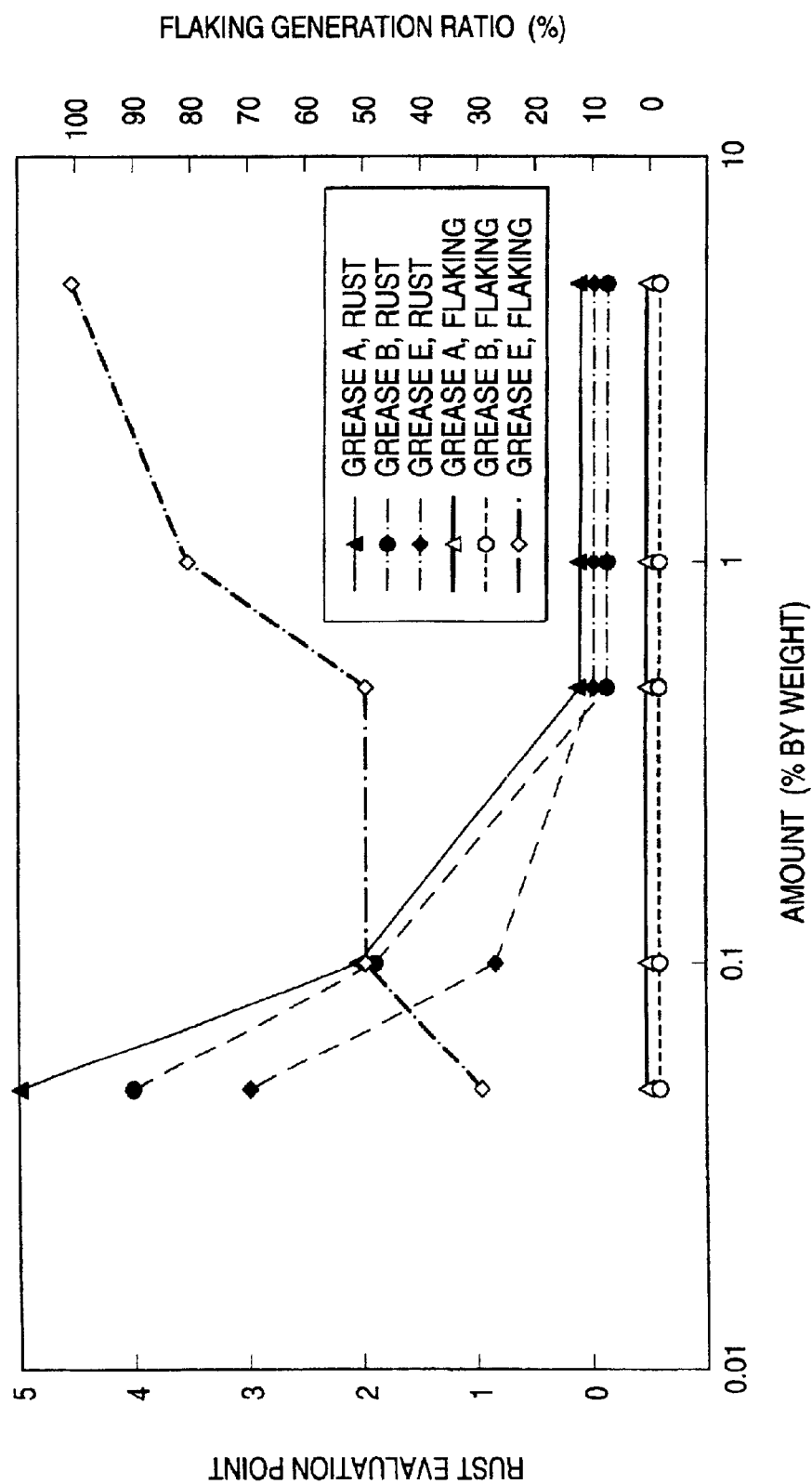
FIG. 1 is a graph showing the relationship between the rust-preventive addition amount, and the rust evaluation point or the flaking generation ratio of the grease A, the grease B, and the grease E in the examples.

Hereinafter, a rolling bearing of the invention will be explained in detail.

In the invention, the bearing structure itself is not limited, but various known ball bearings, roller bearings, or the like can be adopted. With grease composition containing a rust-preventive additive later described packed in a bearing space formed by an inner race, an outer race, and rolling elements, a rolling bearing according to the invention can be provided.

Base Oil

In the invention, a base oil to be used for a grease composition is not particularly limited, and any of those ordinarily used as a base oil for a lubricant oil can be used. In order to avoid generation of a noise at the time of starting the drive in a low temperature due to an insufficient low temperature flowability, or seizure generated by difficulty in forming an oil film at a high temperature, the kinematic viscosity at 40° C. of a base oil is preferably 10 to 400 ($mm^2$/sec), more preferably 20 to 250 ($mm^2$/sec), and further preferably 40 to 150 ($mm^2$/sec).

As a specific example, various kinds of ore-based, synthetic oil-based, or natural oil-based lubricant oils can be presented. As the ore-based lubricant oils, ore oils refined by an optional combination of a reduced pressure distillation, an oil solution deasphalting, a solvent extraction, a hydrogenolysis, a solvent dewaxing, a sulfuric acid washing, a clay refining, a hydrorefining, or the like can be used. As the synthetic oil-based lubricant base oils, hydrocarbon-based oils, aromatic group-based oils, ester-based oils, ether-based oils, or the like, can be presented. Examples of the hydrocarbon-based oils include poly-α-olefins such as a normal paraffin, an isoparaffin, a polybutene, a polyisobutylene, a 1-decene oligomer, and a cooligomer of a 1-decene and an ethylene, and hydrides thereof. Examples of the aromatic group-based oils include alkyl benzenes such as a monoalkyl benzene, and a dialkyl benzene, and alkyl naphthalenes such as a monoalkyl naphthalene, a dialkyl naphthalene, and a polyalkyl naphthalene. Examples of the ester-based oils include diester oils such as a dibutyl sebacate, a di-2-ethylhexyl sebacate, a dioctyl adipate, a diisodecyl adipate, a ditridecyl adipate, a ditridecyl glutarate, and a methyl-acetyl cineolate, aromatic ester oils such as a trioctyl trimellitate, tridecyl trimellitate, and tetraoctyl pyromellitate, polyol ester oils such as a trimethylol propane caprylate, a trimethylol propane pelargonate, a pentaerythritol-2-ethylhexanoate, and a pentaerythritol pelargonate, and complex ester oils, which are an oligoester of a polyhydric alcohol and a mixed fatty acid of a dibasic acid and a monobasic acid. Examples of the ether-based oils include polyglycols such as a polyethylene glycol, a polypropylene glycol, a polyethylene glycol monoether, and a polypropylene glycol monoether, and phenyl ether oils such as a monoalkyl triphenyl ether, an alkyl diphenyl ether, a dialkyl diphenyl ether, a pentaphenyl ether, a tetraphenyl ether, a monoalkyl tetraphenyl ether, and a dialkyl tetraphenyl ether. As other synthetic lubricant base oils, a tricresyl phosphate, a silicone oil, a perfluoroalkyl ether, or the like, can be presented. Examples of the natural oil-based lubricant base oils include fatty oils such as beef tallow, lard, soy bean oil, rapeseed oil, rice oils, coconut oil, palm oil, and palm kernel oil, and hydrides thereof.

Among the above-mentioned base oils, the poly-α-olefins, the dibutyl sebacate, the diisodecyl adipate, the pentaerythritol-2-ethylhexanoate, the dialkyl diphenyl ether, or the like are particularly preferable. Moreover, these base oils can be used alone or as a mixture, adjusted into the above-mentioned preferable kinematic viscosity.
Thickener Also as to the thickener, it is not particularly limited as long as it has an ability of forming a gel structure and retaining the base oil in the gel structure. For example, metal soaps such as a metal soap made from Li, Na, or the like, and a complex metal soap selected from the group consisting of Li, Na, Ba, and Ca, and non-soaps such as a bentone, a silica gel, a urea compound, a urea-urethane compound, and a urethane compound, can be optionally selected and used. However, in consideration of the heat resistance of the grease, a urea compound, a urea-urethane compound, a urethane compound, and a mixture thereof are preferable. As the urea compound, the urea-urethane compound, and the urethane compound, specifically, a diurea compound, a triurea compound, a tetraurea compound, a polyurea compound, a urea-urethane compound, a diurethane compound, and a mixture thereof, can be presented. Among these examples, a diurea compound, a urea-urethane compound, a diurethane compound, and a mixture thereof are particularly preferable. In consideration of the heat resistance and the sound property, it is further preferable to contain the diurea compound.
Rust-Preventive Additive In the invention, the rust-preventive additive contains at least one of the below-mentioned naphthenate or succinic acid derivative. The naphthenate and the succinic acid derivative are safe compounds without the risk of affecting a human body.
Naphthenate It is not particularly limited as long as it is a saturated carboxylate having a naphthene core. Examples thereof include a saturated monocyclic carboxylate ($C_nH_{2n-1}COOM$), a saturated polycyclic carboxylate ($C_nH_{2n-3}COOM$), and a derivative thereof. For example, in the case of a monocyclic carboxylate, it is represented by:

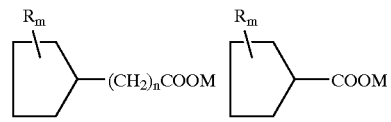

or the like. In the general formulae, R represents a hydrocarbon group. Specific examples thereof include an alkyl group, an alkenyl group, an aryl group, an alkaryl group and an aralkyl group. Moreover, M represents a metal element. Specific examples thereof include Co, Mn, Zn, Al, Ca, Ba, Li, Mg, Cu, and Zr. These naphthenates can be used alone or in a combination thereof optionally.
Succinic Acid Derivative As the succinic acid derivative, for example, a succinic acid, an alkyl succinic acid, an alkyl succinic acid half ester, an alkenyl succinic acid, an alkenyl succinic acid half ester, and a succinic acid imide, or the like can be presented. These succinic acid derivatives can be used alone or in a combination thereof optionally.
Concentration The amount of the naphthenate and the succinic acid derivative is preferably 0.1 to 10% by weight each with respect to the grease total amount. With a smaller amount, the rust-preventive property cannot be provided sufficiently, but in contrast, with a larger amount, the grease is softened so that leakage of the grease may be generated, and thus it is not preferable. For ensuring the rust-preventive property while considering the seizure life to be influenced by the grease leakage, it is preferably 0.25 to 5% by weight each based on the grease total amount. Moreover, in the case of adding both naphthenate and succinic acid derivative, the total amount is in the range of 0.1 to 10% by weight.
Other additives To the grease composition, as needed, conventionally known various additives, such as an extreme pressure agent, and an oilness agent can be added.
Production Method The method for preparing the grease composition is not particularly limited, but it is preferable to add a predetermined amount of a naphthenate or a succinic acid derivative in a grease composition obtained by reacting a thickener in a base oil. At the time, after adding the naphthenate or the succinic acid derivative, the operation of sufficiently agitating with a kneader, a roll mill, or the like is needed for homogeneous dispersion. It is also effective to apply heat while executing the process. Moreover, in the case of adding an additive other than the naphthenate and the succinic acid derivative, in view of the processing step, it is preferable to add the same simultaneously with the naphthenate and the succinic acid derivative.

Hereinafter, further specific description will be given with reference to examples and comparative examples, but the invention is not limited thereto.

Grease Preparation

As shown in the table 1, greases A to E were prepared. As the preparation method, a base oil with a diisocyanate mixed, and the same base oil with an amine mixed were reacted, agitated and heated so as to obtain a semi-solid product. An amine-based antioxidant preliminarily dissolved in the same base oil was added thereto, sufficiently agitated, and gradually cooled down. Then, a naphthenate, a succinic acid derivative, and a Ba sulfonate were added optionally, and it was passed through a roll mill so as to obtain a grease. Moreover, with using each of greases A to E, 5 kinds thereof were prepared each with the amount of the naphthenate, the succinic acid derivative, and the Ba sulfonate based on the grease total amount being 0.05% by weight, 0.1% by weight, 0.5% by weight, 1% by weight, and 5% by weight.

TABLE 1

Grease Composition

|  | Grease A | Grease B | Grease C | Grease D | Grease E |
|---|---|---|---|---|---|
| Thickener | Urea compound | Urea compound | Urea compound | Urea compound | Urea compound |
| Base oil | PAO[4] | Ether oil[5] | PAO | PAO | PAO |
| Base oil kinematic Viscosity[1] | 50 | 100 | 50 | 50 | 50 |
| Naphthenate[2] | 0.05–5 | — | 0.05–5 | 0.1 | — |
| Succinic acid derivative[3] | — | 0.05–5 | 0.1 | 0.05–5 | — |
| Ba sulfonate | — | — | — | — | 0.05–5 |

[1] $mm^2/sec$, 40° C.
[2] Zinc naphthenate (% by weight)
[3] Alkenyl succinic acid half ester (% by weight)
[4] Polyalphaolefin
[5] Dialkyl diphenyl ether Quick Acceleration and Deceleration Test The flaking life was evaluated by quickly accelerating and decelerating a bearing assembled in an alternator, by an engine. That is, a single row deep groove ball bearing (inner diameter φ17 mm, outer diameter φ47 mm, width 14 mm) having 2.36 g of each of the above-mentioned greases packed was assembled in an alternator for executing a test by continuously rotating the bearing in a 1,000 to 6,000 rpm engine rotational frequency (bearing rotational frequency 2,400 to 13,300 rpm) repetition, room temperature, and 1,764N pulley load condition for a 500 hour target time. Moreover, when flaking was generated on the bearing outer race running surface so as to generate vibration, the test was finished. The test was executed 10 times for each condition. Results of the evaluation by the flaking generation ratio defined as mentioned below are plotted in FIGS. 1 and 2.

Flaking generation ratio (%)=(number of flaking generation/number of tests)×100

Rust prevention Test

A deep groove ball bearing having a φ17 mm inner diameter, a φ47 mm outer diameter, and a 14 mm width having a round contact rubber seal, with 2.3 g of each of the above-mentioned greases packed was rotated at 1,800 rpm for one minute. After the rotation, 0.5 ml of a 0.5% by weight salt water was injected into the bearing, and it was rotated at 1,800 rpm for one minute. After leaving for 120 hours in a 60° C., 100% RH condition, the rust generation state on the inner and outer raceway surface of the tested bearing was observed. According to the evaluation standard shown in the table 2, a rust generation state of 2 or less was judged to be passed. The test was executed 10 times for each condition. Results are plotted in FIGS. 1 and 2.

TABLE 2

Rust Generation Dstate

| Rust evaluation point | Rust state |
|---|---|
| 0 | without rust |
| 1 | stain rust |
| 2 | spot rust |
| 3 | small rust |
| 4 | middle rust |
| 5 | large rust |

As shown in FIGS. 1 and 2, by packing the grease A, grease B, grease C and grease D according to the invention, containing at least one of the naphthenate and the succinic acid derivative as the rust-preventive additive, generation of the rust and the flaking in the bearing can be restrained. As to the amount thereof, the excellent effect was obtained with a 0.1% by weight or more amount. In contrast, although the rust generation was not observed, the flaking was generated with the Ba sulfonate as the conventional rust-preventive additive.

That is, in FIG. 1, although the rust evaluation point of the grease A and the grease B of the invention satisfies the pass evaluation point upper limit value 2 with a 0.1% by weight amount of the rust-preventive additive (the second from left plotted group), the evaluation point is 0 with at least a 0.5% by weight, and thus it is further preferable. Moreover, in FIG. 2, with respect to the 0.1% by weight lower limit value of the invention, the leftmost point (0.15% by weight amount of the rust-preventive additives) satisfies the pass point 2 or less of the rust evaluation. This denotes that a good result can be obtained with at least 0.15 by weight of the total rust-preventive additives. However, since the rust evaluation point is 2, that is same as the case of 0.1% by weight, the preferable lower limit of the amount is 0.25% by weight, that is more than 0.15% by weight, and further preferably 0.5% by weight.

Although the points on each of the greases A to D and the lines linking the same are shown separately for the convenience of description in FIGS. 1 and 2, actually the points and the lines are overlapped.

As heretofore explained, according to the invention, a rolling bearing having a good rust-prevention property and the excellent flaking prevention effect without a hazard to a human body can be obtained. A rolling bearing, in particular preferable for electric parts for an automobile or engine accessories including an alternator, an electromagnetic clutch for an automobile air-conditioner, an intermediate pulley, an electric driven fan motor, and a water pump can be provided.

While the invention has been described in detail and with reference to specific embodiments thereof, it will be apparent to one skilled in the art that various changes and modifications can be made therein without departing from the spirit and scope thereof.

What is claimed is:

1. A rolling bearing comprising an inner race, an outer race and rolling elements, with a grease composition comprising, as the main components, a base oil, a thickener and at least one kind of a rust-preventive additive made from a naphthenate or a succinic acid derivative, wherein the naphthenate is a saturated monocyclic carboxylate represented by $C_nH_{2n-1}COOM$, a saturated polycyclic carboxylate represented by $C_nH_{2n-3}COOM$, a derivative thereof or a mixture thereof, wherein M represents a metal element, packed in a bearing space formed by at least the inner race, the outer race and the rolling elements, said at least one kind of a rust-preventive additive is present in an amount of 0.1 to 10% by weight based on the total amount of the grease composition, and wherein the thickener is selected from the group consisting of a urea compound, a urea-urethane compound, a urethane compound and mixtures thereof; said rolling bearing being adapted for use as electric parts for an automobile; and further, wherein said grease is effective in preventing flaking accompanying a white structure observed in electric accessories of an automobile.

2. The rolling bearing as claimed in claim 1, wherein M is selected from the group consisting of Zn, Al, Ca, Ba, Li and Mg.

3. The rolling bearing as claimed in claim 2, wherein the succinic acid derivative is a succinic acid, an alkyl succinic acid, an alkyl succinic acid half ester, an alkenyl succinic acid, an alkenyl succinic acid half ester or a succinic acid imide.

4. The rolling bearing as claimed in claim 3, wherein the amount of said at least one kind of the rust-preventive additive based on the total amount of the grease composition is 0.25 to 5% by weight.

5. The rolling bearing as claimed in claim 4, wherein said at least one kind of the rust-preventive agent is a combination of a naphthenate acid compound and a succinic acid compound.

6. The rolling bearing as claimed in claim 5, wherein the naphthenate acid compound is zinc naphthenate and the succinic acid compound is a succinate half ester.

7. The rolling bearing as claimed in claim 6, wherein the base oil comprises at least one of synthetic hydrocarbon oil and ether oil.

8. The rolling bearing as claimed in claim 7, wherein the base oil has a kinematic viscosity at 40° C. of 40 to 150 $mm^2$/sec.

9. The rolling bearing as claimed in claim 4, wherein the base oil comprises at least one of synthetic hydrocarbon oil and ether oil.

10. The rolling bearing as claimed in claim 5, wherein the base oil has a kinematic viscosity at 40° C. of 40 to 150 $mm^2$/sec.

* * * * *